United States Patent
Nichols et al.

(10) Patent No.: US 11,814,026 B2
(45) Date of Patent: Nov. 14, 2023

(54) COMPRESSION WHEEL CHOCK SYSTEM

(71) Applicant: AVID Labs, LLC, Fort Wayne, IN (US)

(72) Inventors: Joel A Nichols, Columbia City, IN (US); Josh D Thomas, Fort Wayne, IN (US); Connor Digan, Fort Wayne, IN (US)

( * ) Notice: Subject to any disclaimer, the term of this patent is extended or adjusted under 35 U.S.C. 154(b) by 0 days.

(21) Appl. No.: 17/109,256

(22) Filed: Dec. 2, 2020

(65) Prior Publication Data
US 2022/0169212 A1   Jun. 2, 2022

(51) Int. Cl.
| | |
|---|---|
| *B60T 3/00* | (2006.01) |
| *B60P 3/077* | (2006.01) |
| *B64G 1/16* | (2006.01) |
| *B64F 1/16* | (2006.01) |

(52) U.S. Cl.
CPC ............... *B60T 3/00* (2013.01); *B60P 3/077* (2013.01); *B64F 1/16* (2013.01)

(58) Field of Classification Search
CPC .... B60T 3/00; B64F 1/16; B60P 3/075; B60P 3/077; B60P 3/079; B60P 7/0838; B65D 63/14; F16G 11/14; F16G 11/04; F16G 11/046; F16G 11/103; Y10T 24/39; Y10T 24/3916; Y10T 24/3918; Y10T 24/314
USPC .......................................................... 188/4 R
See application file for complete search history.

(56) References Cited

U.S. PATENT DOCUMENTS

| | | | | | |
|---|---|---|---|---|---|
| 1,101,883 | A | * | 6/1914 | Rochford | B60T 3/00 188/4 R |
| 2,460,640 | A | * | 2/1949 | Jensen | D06F 53/04 24/130 |
| 3,026,973 | A | * | 3/1962 | Piel | B60T 3/00 188/32 |
| D283,022 | S | * | 3/1986 | Cameron | B60P 3/075 D12/217 |
| 5,586,621 | A | * | 12/1996 | Moon | B60T 3/00 188/4 R |
| 6,290,029 | B1 | * | 9/2001 | Gubler | B61H 7/02 188/4 R |
| 6,557,217 | B2 | * | 5/2003 | Szabo | F16G 11/14 24/129 B |
| 7,513,725 | B1 | * | 4/2009 | Bullock | B60P 3/079 410/11 |
| D604,589 | S | * | 11/2009 | Johansson | D06F 53/04 D8/356 |
| 8,430,612 | B1 | * | 4/2013 | Randall | B60P 3/075 410/3 |
| 9,168,044 | B2 | * | 10/2015 | Kirkham | F16G 11/04 |

(Continued)

FOREIGN PATENT DOCUMENTS

| | | | | | |
|---|---|---|---|---|---|
| CN | 113135138 | A | * | 7/2021 | .......... B60R 25/093 |
| GB | 2271539 | A | * | 4/1994 | .......... B60R 25/093 |

*Primary Examiner* — Taylor Morris

(57) ABSTRACT

A compression wheel chock system is disclosed. The system is comprised of two, triangular-shaped devices having longitudinal channels and a lanyard. An object of the apparatus is to enhance wheel chocking by preventing a wheel from moving both fore and aft while chocked. During installation, the lanyard is fed through a channel in each chock and is drawn tight by the user. As the lanyard is tightened it compresses the chocks around the wheel while at the same time compressing the channels and securing the lanyard therein.

9 Claims, 4 Drawing Sheets

SECTION VIEW

(56) References Cited

U.S. PATENT DOCUMENTS

| | | | | |
|---|---|---|---|---|
| 2001/0040073 A1* | 11/2001 | Agtuca | ............ | B60T 3/00 |
| | | | | 188/32 |
| 2002/0005321 A1* | 1/2002 | Agtuca | ............ | B64F 1/16 |
| | | | | 188/32 |
| 2003/0047391 A1* | 3/2003 | Ericson | ............ | B60T 3/00 |
| | | | | 188/32 |
| 2004/0045774 A1* | 3/2004 | D'Alessio | ............ | B60T 3/00 |
| | | | | 188/4 R |
| 2004/0120784 A1* | 6/2004 | Sargent | ............ | B60P 3/075 |
| | | | | 410/20 |
| 2006/0016643 A1* | 1/2006 | Blumenthal | ............ | B60T 3/00 |
| | | | | 188/4 R |
| 2013/0048439 A1* | 2/2013 | Marcum | ............ | B60P 3/077 |
| | | | | 188/32 |
| 2021/0031736 A1* | 2/2021 | Perozzo | ............ | B64F 1/16 |

* cited by examiner

COMPRESSION WHEEL CHOCK SYSTEM

FIELD OF THE INVENTION

The disclosed apparatus relates to chocks. More specifically, it relates to a novel system and method for chocking wheels.

BACKGROUND

Wheel chocks are wedges that are positioned against a vehicle's tires to prevent unwanted movement. Chocks are usually placed under vehicles for safety in addition to setting the brakes. The bottom surface of chocks is sometimes coated in rubber to enhance grip with the ground. For ease of removal, a rope or lanyard may be tied to the chock or a between a set of two chocks. One edge of the chock usually has a concave profile to conform to the wheel and increase the force necessary to overrun the chock. Most commonly, chocks are seen on aircraft and train cars. The Occupational Safety and Health Administration has guidelines that require wheel chocks be installed on trailers during loading or to prevent them from moving away from a dock while being loaded using fork lifts. One of the first wheel chock patents in the United States was patented by Wesley Reed in 1974 (U.S. Pat. No. 3,993,167A). This chock was made of a triangle, rubber shaped material. U.S. Pat. No. USD474,729S1 granted to Sargent teaches of an adjustable wheel chock. U.S. Pat. No. 4,615,416A granted to Wilson disclosed a heavy duty wheel chock that grips both the tire and the ground surface. U.S. Pat. No. 4,911,270A granted to Hudson disclosed a wheel chock with two saddles that cradle a tire between. No patents were found that compress a tire between two chocks with a lanyard.

SUMMARY OF THE INVENTION

The device herein disclosed and described provides a solution to the shortcomings in the prior art through the disclosure of a novel wheel chocking system and method. An object of the apparatus is to prevent a wheel from moving both fore and aft while chocked. Each chock is placed in front of and behind a tire and secured with a lanyard preventing any such movement from taking place.

Another object of the apparatus is to secure the chocks tightly against a tire. The chocks are affixed tightly against the tire by using a lanyard. The lanyard is knotted onto one chock and threaded through a channel on the other chock. Once the user pulls on the lanyard, the chocks compress the channels thereby locking the lanyard in place and holding them tightly onto the tire.

Another object of the apparatus is to allow the chocks to be easily transported. The lanyard can be threaded through both chocks when not being used and carried by a user.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

DETAILED DESCRIPTION OF THE FIGURES

Figure 1:
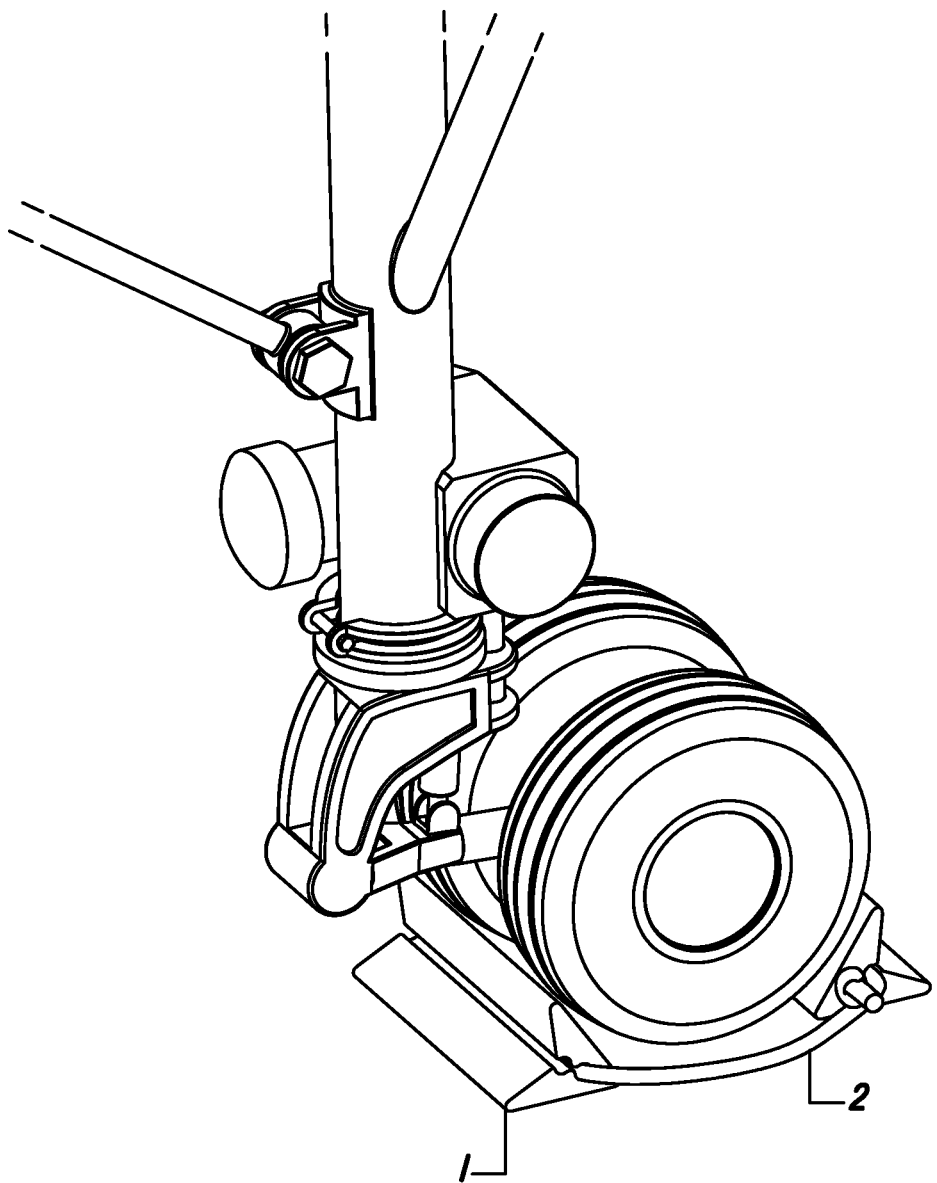
FIG. 1 showing a perspective view of the apparatus.
Figure 2:
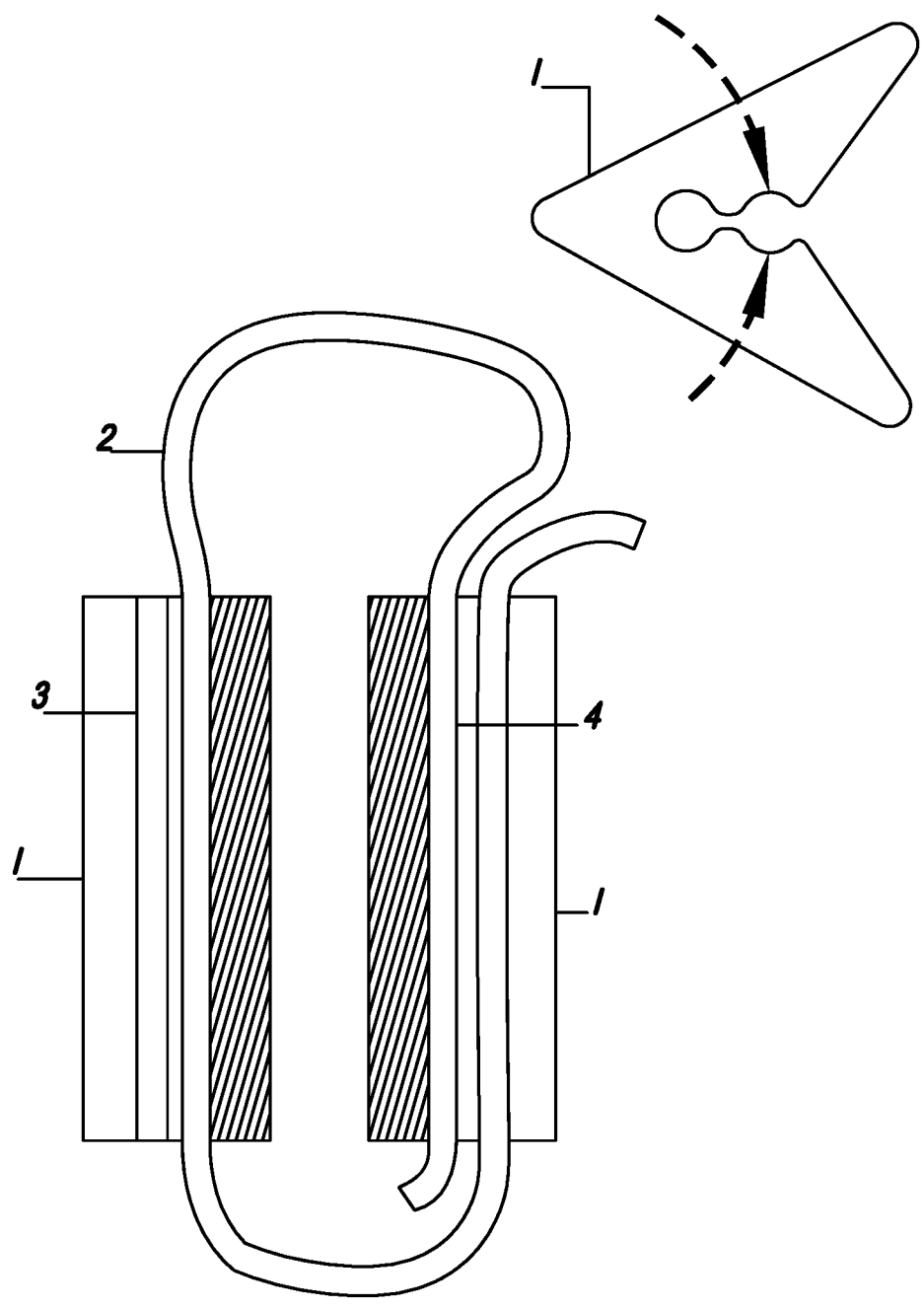
FIG. 2 showing a sectional view of the apparatus being used.
Figure 3:
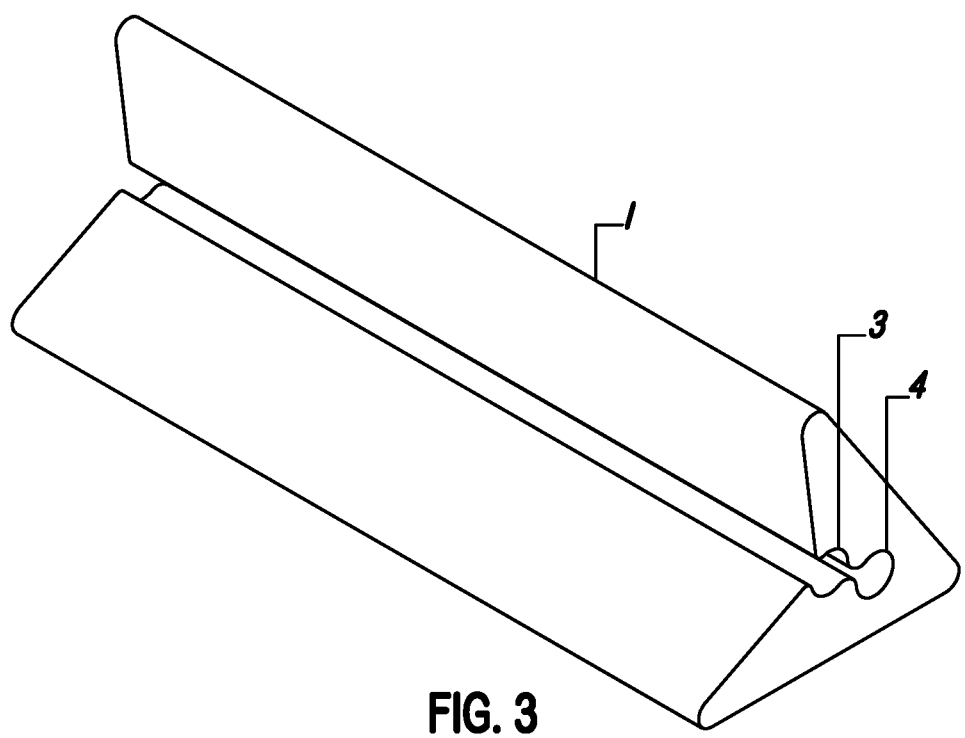
FIG. 3 showing a perspective view of the apparatus.
Figure 4:
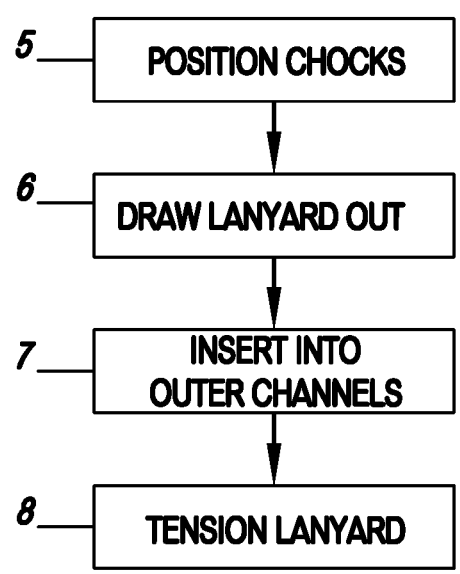
FIG. 4 showing a representative view of the method.

FIG. 1 and FIG. 3 showing perspective views of a preferred embodiment of the apparatus comprised of at least two triangular-shaped chocks 1 and a lanyard 2. Chocks 1 having a proximal channel 4 and a distal channel 3 configured along their longitudinal axis. Said chocks 1 are made of a rigid, but slightly flexible material such as but not limited to rubber, plastic and the like. The aforementioned lanyard 2 being made of a material including but not limited to nylon, dyneema™, amsteel™, etc. FIG. 2 showing a section view of chocks 1 and lanyard 2 installed inside proximal channel 4 and a distal channel 3 in each chock 1. FIG. 4 showing a representative view of the apparatus' method wherein a user first positions chocks 1 in front of and behind a tire in step 5. The user draws the lanyard out from the proximal channel 4 of the front chock 1 and surrounds the tire in step 6. In step 7, lanyard 2 is inserted and threaded through distal channel 3 of the rear chock. Said lanyard 2 is then re-routed back into the distal channel 3 of the front chock 1. Finally, in step 8 the user pulls the end of lanyard 2 tightly allowing chocks 1 to tighten against the wheel, compressing chocks 1 and allowing distal channels 3 to clamp down on lanyard 2 thereby securing the tire therebetween.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

What is claimed is:

1. A system for chocking tires comprised of the following parts:
    a) at least two chocks for preventing a tire from moving fore and aft, and
    b) a lanyard for securing the chocks against the tire;
    wherein the chocks each have a distal channel along their longitudinal axis, each distal channel being open to each of two ends of the chock, and each distal channel being open along its length to a side of the chock distal from the tire, and each distal channel being configured to receive the lanyard from the side of the chock distal from the tire, and to hold the lanyard therein;
    wherein the chocks each have a proximal channel along their longitudinal axis, each proximal channel being adjacent to the distal channel,
    the proximal channel being open to each of the two ends of the chock, and the proximal channel being open along its length to the distal channel, and the proximal channel being configured to receive the lanyard from the side of the chock distal from the tire by way of the distal channel;
    the proximal and distal channel intersecting tangentially by way of filleted surfaces thereby adjoining to define a longitudinal space interposed therebetween;
    wherein the proximal channel of at least one of the at least two chocks being configured to hold the lanyard therein; and
    wherein; the chocks, the lanyard, the distal channel, and the proximal channel are configured to compress the distal charnel and the proximal channel when tension is placed on the lanyard and the chocks are held onto the tire.

2. The system for chocking tires of claim 1, wherein: the chocks are each triangular in shape.

3. The system for chocking tires of claim 2, wherein; the chocks are made of a rigid but slightly flexible material.

4. A method for chocking tires comprised of the following steps:
    a) positioning chocks around a tire;
    b) drawing a lanyard around the tire;
    c) inserting the lanyard into the chocks; and
    d) tensioning the lanyard;
    wherein the chocks each have a distal channel along their longitudinal axis, each distal channel being open to each of two ends of the chock, and each distal channel being open along its length to a side of the chock distal from the tire, and each distal channel being configured to receive the lanyard from the side of the chock distal from the tire, and to hold the lanyard therein;
    wherein the chocks each have a proximal channel along their longitudinal axis, each proximal channel being adjacent to the distal channel;
    the proximal channel being open to each of the two ends of the chock, and the proximal channel being open along its length to the distal channel, and the proximal channel being configured to receive the lanyard from the side of the chock distal from the tire by way of the distal channel;
    the proximal and distal channel intersecting tangentially by way of filleted surfaces thereby adjoining to define a longitudinal space interposed therebetween; and
    wherein the proximal channel of at least one of the at least two chocks being configured to hold the lanyard therein.

5. The method for chocking tires of claim 4, wherein positioning the chocks includes a step of positioning one chock in front of the tire and one chock behind the tire.

6. The method for chocking tires of claim 5, wherein:
    the chock which is configured to receive and hold the lanyard in both its distal channel and proximal channel is the chock which is located in front of the tire; and
    the step of drawing the lanyard around the tire further includes a step of drawing the lanyard out from the proximal channel of the chock located in front of the tire.

7. The method for chocking tires of claim 6, wherein:
    inserting the lanyard into chocks includes further a step of inserting the lanyard, which was drawn out of the chock located in front of the tire, through the distal channel of the chock located behind the tire.

8. The method for chocking tires of claim 7, wherein:
    inserting the lanyard into chocks includes a further step of inserting the lanyard back into the distal channel the chock located in front of the tire.

9. The method for chocking tires of claim 4, wherein:
    tensioning the lanyard includes a step of tightening the lanyard until the chocks press against the tire and cause the chocks to compress and secure the lanyard.

* * * * *